P. A. FUCHS.
BRACE FOR STEPS OF MOTOR DRIVEN VEHICLES.
APPLICATION FILED FEB. 28, 1917.

1,322,006.

Patented Nov. 18, 1919.

WITNESSES:

INVENTOR

Philip A. Fuchs

BY

ATTORNEYS

UNITED STATES PATENT OFFICE.

PHILIP A. FUCHS, OF MILWAUKEE, WISCONSIN.

BRACE FOR STEPS OF MOTOR-DRIVEN VEHICLES.

1,322,006. Specification of Letters Patent. Patented Nov. 18, 1919.

Application filed February 28, 1917. Serial No. 151,429.

*To all whom it may concern:*

Be it known that I, PHILIP A. FUCHS, citizen of the United States, residing at Milwaukee, county of Milwaukee, and State of Wisconsin, have invented new and useful Improvements in Braces for Steps of Motor-Driven Vehicles, of which the following is a specification.

My invention relates to improvements in braces for the running boards of motor driven vehicles.

The object of my invention is to provide an inexpensive, simple, and efficient attachment that can be easily applied by inexpert persons.

A further object is the prevention of rattling of the mud guard, running boards, and associated parts which is almost invariably present in the cheaper grades of cars. Such cars are not made strong enough to prevent them from yielding under any considerable weight as of a person getting into or out of the vehicle, thereby straining the parts and their connections until vibration with consequent squeaking and rattling noises result. Neither are the ordinary fastenings or braces made sufficiently rigid so as to prevent yielding and rattling as the vehicle travels over rough and uneven roads.

In the drawings—

Like parts are identified by the same reference characters in both views.

Figure 1:
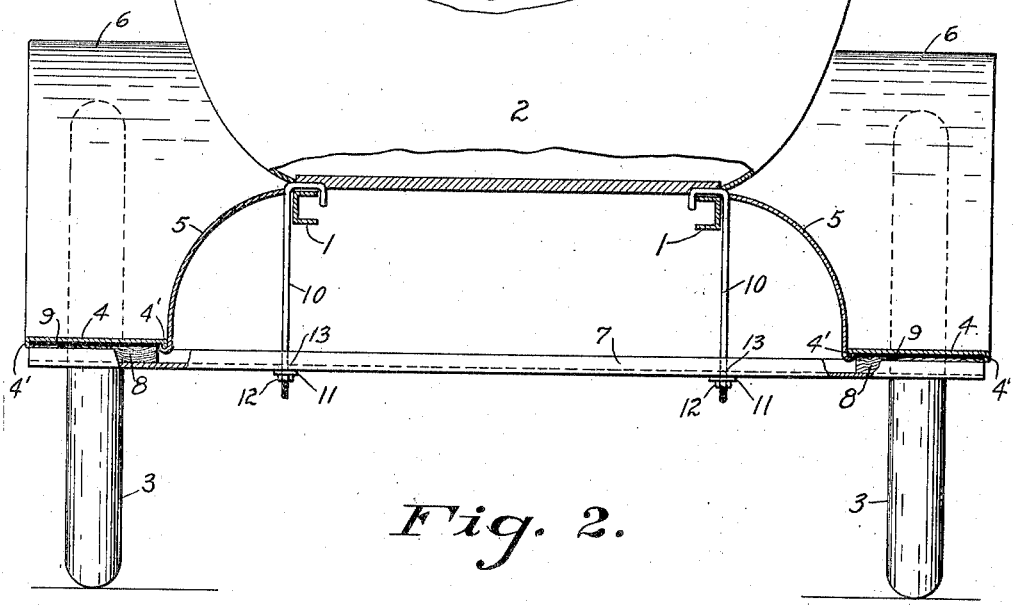
Figure 1 is a transverse view, partly in vertical section, of portions of a motor driven vehicle embodying my invention.
Figure 2:
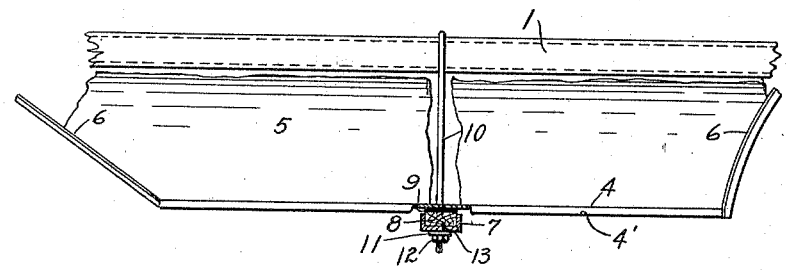
Fig. 2 is a side view of portions of a motor driven vehicle with my improved brace attached, parts being shown in section.

1 is the main frame of a vehicle of the above described class upon which the body 2 is fastened; with wheels 3, running boards 4, apron 5, and mud guard 6 attached. These parts being of ordinary construction and in common use, they need not be described with greater detail.

A bar of channel iron 7 of a sufficient length to extend the entire width of the vehicle is provided near each end with blocks 8. These blocks are preferably formed of wood, with a rubber strip 9 secured to the top of each block to diminish rattling. Rubber is preferably employed although other comparatively soft materials can be used with good results.

To fasten the brace in place, hook bolts 10 are provided. The longer end of each bolt is screw threaded to allow lock washers 11 and bolts 12 to be screwed thereon. The brace is provided with holes 13 placed so as to allow the depending ends of the bolts 10 to enter said holes, when the apparatus is assembled for use.

The hook ends of the bolts are hung from the main frame at points on a line at right angles to the center line of the vehicle, and approximately midway between the ends of the running boards. The exact location is not material, it being merely desirable to locate the brace near the center of the running board in order to give the best possible support, unless, of course, more than one brace is used, in which case a different arrangement of the braces would be desirable so that the best possible supporting effect may be had.

The threaded ends of the hooks are inserted in the holes 13, when washer 11 and nut will be screwed in place, thus drawing the brace upwardly and forcing the blocks 8 to rigidly hold the running boards in normal position, it being, of course, understood that when the brace is in place with respect to the hook bolts, the blocks 8 will engage the bottom of the running boards 4 between the down turned flanges 4', 4'.

The blocks are preferably made of sufficient length to extend the entire width between the flanges 4', 4' of the running board. The block is not limited to any specific length less than the width of the step, as a shorter block than the one shown, might be used or more than one block might be applied to each end and still accomplish the desired purpose. The blocks are preferably made wide enough so that force is required to insert them between the U-shaped sides of the channel bar. It has been attempted to hold the blocks by laying them on the bottom of the channel bar and forcing the flanges together, thus exerting pressure on the block. It has been found, however, that the first mentioned way is more efficient.

I am aware that braces have been made in which the outer end of a supporting bar were bent upwardly at an angle into direct contact with the running board. This does not give the desired results as such a bar causes a continuous rattling sound when the car is in motion. The wooden blocks with the resilient strips secured thereto effectively deaden all rattling, thus providing a noiseless, strong brace, and the channel bar has sufficient resilience to maintain a supporting pressure against the running board under all conditions, the pull of the hooks being exerted upon the channel bar between the blocks.

I claim:

The combination with the frame and running boards of a motor driven vehicle, said running board having downturned flanges at their inner and outer margins, of a channel bar transversely disposed and arranged with its end portions underneath the running boards with the said flanges adjacent the opposite upturned sides of the said bar, supporting blocks mounted in the respective end portions of the channel bar and anchored between the sides thereof, said blocks being of lengths substantially equal to the width of the respective running boards and disposed between the downturned flanges thereof and arranged to bear upon the under surfaces of the running boards between said flanges, said flanges of the boards and sides of the bar being adapted for preventing longitudinal and transverse shifting of the blocks and hook bolts adjustably connecting the intermediate portions of the channel bar with the frame of the vehicle and adapted to draw the channel bar and its blocks upwardly in supporting relation to the running boards on each side of the vehicle.

In testimony whereof I affix my signature in the presence of two witnesses.

PHILIP A. FUCHS.

Witnesses:
 EDW. HAKER,
 WILLIAM HIECKE.